Nov. 23, 1926. Re. 16,487

E. H. GOLD ET AL.

HEATING SYSTEM

Original Filed March 24, 1919 4 Sheets-Sheet 1

Inventors
Egbert H. Gold
and Edward A. Russell
By Barnett & Truman
Attorneys

Nov. 23, 1926. Re. 16,487
E. H. GOLD ET AL.
HEATING SYSTEM
Original Filed March 24, 1919 4 Sheets-Sheet 2
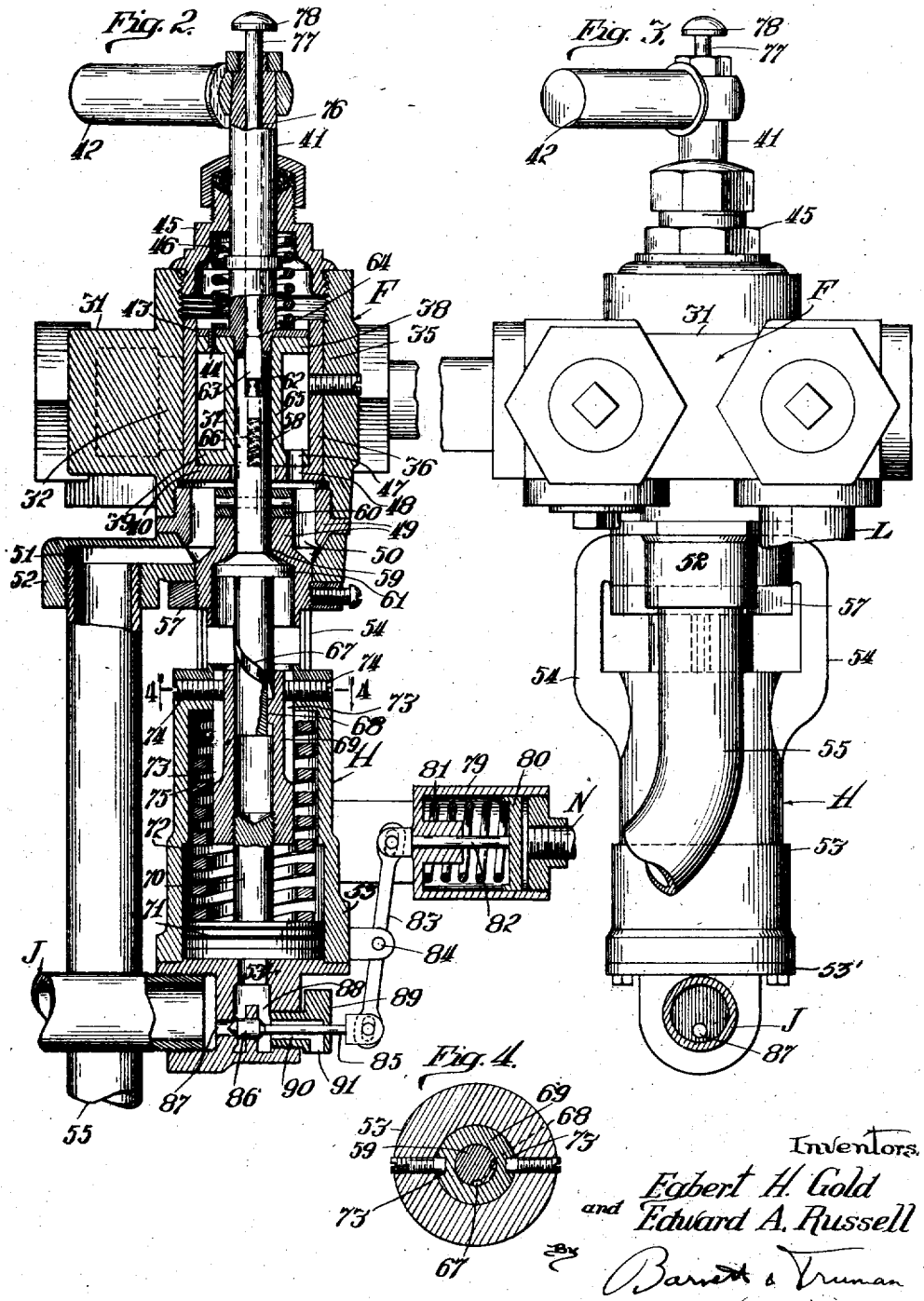
Inventors,
Egbert H. Gold
and Edward A. Russell
By Barrett & Truman
Attorneys Nov. 23, 1926. Re. 16,487

E. H. GOLD ET AL

HEATING SYSTEM

Original Filed March 24, 1919 4 Sheets-Sheet 3

Inventors
Egbert H. Gold
and
Edward A. Russell
By Barnett & Truman
Attorneys

Nov. 23, 1926. Re. 16,487

E. H. GOLD ET AL

HEATING SYSTEM

Original Filed March 24, 1919 4 Sheets-Sheet 4

Inventors.
Egbert H. Gold
and
Edward A. Russell
By Barnett & Truman
Attorneys

Reissued Nov. 23, 1926.

Re. 16,487

UNITED STATES PATENT OFFICE.

EGBERT H. GOLD AND EDWARD A. RUSSELL, OF CHICAGO, ILLINOIS; SAID RUSSELL ASSIGNOR TO SAID GOLD.

HEATING SYSTEM.

Original No. 1,537,298, dated May 12, 1925, Serial No. 284,616, filed March 24, 1919. Application for reissue filed August 3, 1925. Serial No. 47,998.

Our invention relates to a heating system, and more particularly to a low pressure or vapor system suitable for heating railway cars although the principles of the invention are applicable to other types of car heating apparatus.

A railway passenger car is ordinarily in service only a portion of the time. In the winter season it is necessary to heat the car to a certain extent even when it is out of service and provision is usually made in railway yards or terminals for connecting the steam heating system of a railway car so heated to a source of supply of steam in the yard or terminal, this connection being maintained during the time that the car is standing unoccupied. But at these times it is not necessary to heat the car to a normal living temperature, and although it is a common practice to do this, this practice results in very great waste of fuel. Under ordinary circumstances it should be sufficient to keep the car standing in the yard at a temperature of, say, from forty to fifty degrees Fahrenheit which will suffice to keep the water pipes and fittings from freezing. Having this possibility in mind it is one of the objects of our invention to provide, in connection with a steam heating system, particularly in connection with a vapor system, means whereby, under certain conditions, for example the conditions prevailing when a car is cut off from a locomotive, the amount of radiating surface under steam is automatically reduced with a proportionate reduction of the medium circulated through the system and whereby, when service conditions are resumed, that is, when the train is attached to a locomotive, the maximum radiating surface will be made once more available for use.

A further object, subsidiary to the one just mentioned, is to provide an apparatus which will operate as above described, and which will also permit, independently of the conditions named, a variation in the amount of active heating surface of the radiator, by manual or other control, as may be necessary or desirable in order that during the time the car is in service its temperature may be regulated, as between day temperature and night temperature, for example, or in order that the desired temperature may be maintained in the car under different weather conditions, and in order that the temperature of the car may, if desired, be raised to the maximum when the car is out of service, all without interfering with the automatic return of the controlling means to the low temperature position when the car, having been in service, is again put out of service. By these arrangements the car in service may be heated to the high temperature, to a lower temperature or the heat may be cut off entirely (although by automatic operation of the apparatus it is given the high temperature) whereas when out of service it is always heated at least to the low temperature but may, if desired, be given the maximum amount of heat. With the form of heating system shown and to be described, "high temperature" means the temperature, variable according to weather conditions, produced by having all of the radiating surface active while "low temperature" means that produced when a certain definite amount of heating surface has been made inactive.

Another object of the invention is to provide, in a vapor or low pressure system, means whereby the presence or absence of steam in the steam train pipe determines whether (subject to the action of car temperature controlling devices operated manually or otherwise) the radiating surface of the heating system or portion of the same, shall, on the one hand, be supplied with steam, or on the other hand, shall be cut off from the steam supply and placed in a condition in which the water of condensation can be drained therefrom.

The steam heating system upon which our invention is specifically intended to improve involves the use of one or more radiating coils to which steam is admitted at low pressure and from which the water of condensation is discharged by means of one or more shut off and drain valves, and it is also an object of the invention to provide a motor of novel and improved construction adapted to be operated in one direction by fluid pressure, particularly by steam pressure, and in the other direction by a spring for effecting the movements of the valve with which such motor is associated.

The invention consists of the novel and improved devices, constructions and arrangements, to be hereinafter described and claimed, for carrying out the above stated objects and such other incidental objects as will appear from the following description of a preferred embodiment of the invention.

This embodiment of the invention is illustrated in the accompanying drawings wherein—

Fig. 2 is a vertical sectional view taken through one of the shut off and drain valves and its motor.

Fig. 3 is a view, in elevation, of the parts shown in Fig. 2.

Fig. 4 is a sectional plan on line 4—4 of Fig. 2.

Like characters of reference designate like parts in the several figures of the drawings.

Figure 1:
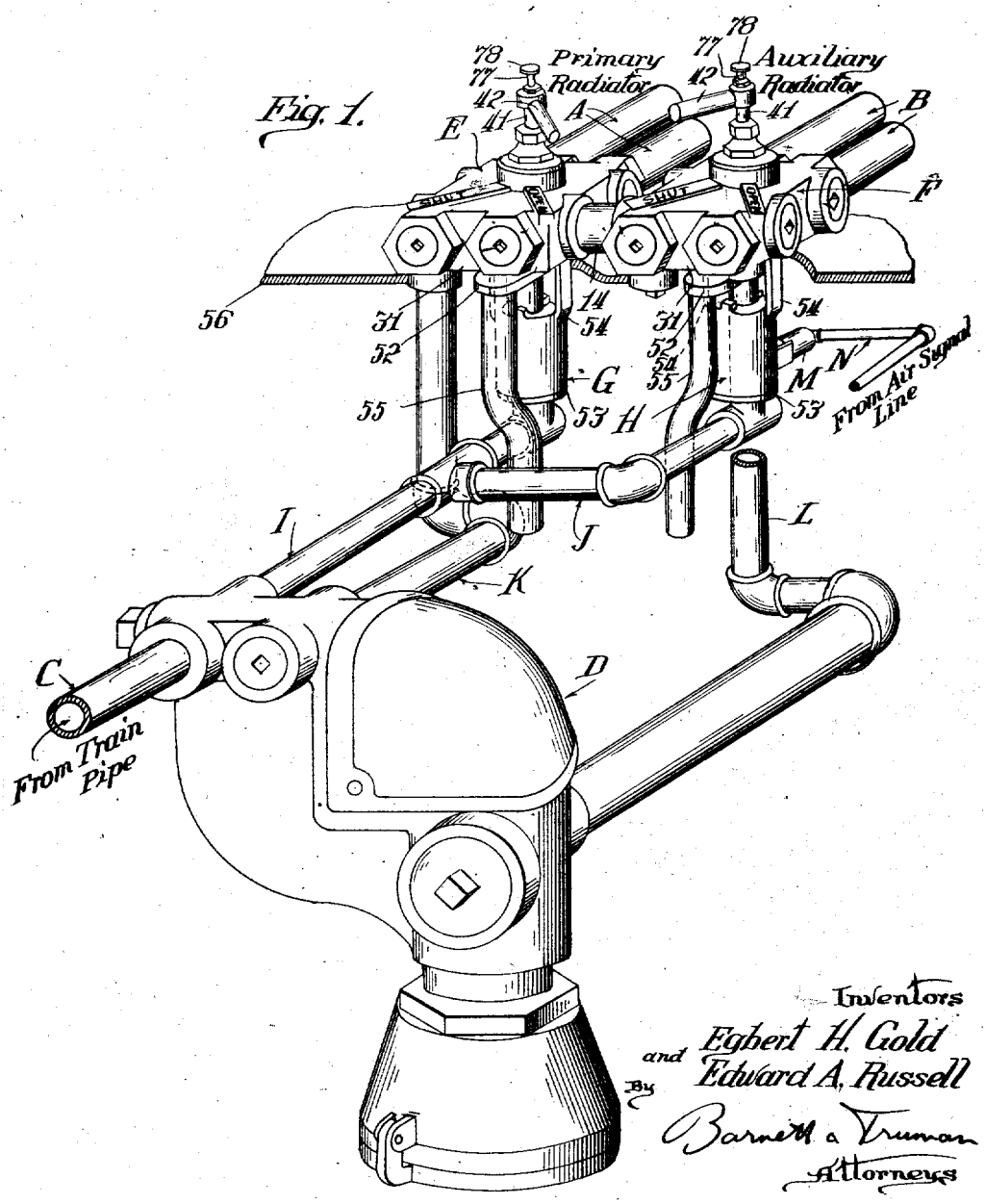
Fig. 1 is a view, in perspective, of the controlling elements of the heating system of our invention, the flooring of the car being shown in section.

The heating system, in the preferred embodiment shown in the drawings, consists essentially of the following elements: A is a radiating coil which is termed a primary radiator because it is always under steam when the heating system is in operation. B is an auxiliary radiating coil preferably arranged in series with the primary radiator and adapted for occasional use, the two coils constituting, because of their serial arrangement, a single radiator through all of which (both coils) or through a portion of which only (coil A) heating medium may be circulated in accordance with the requirement of the car for heat. C is a steam supply pipe connected with the train line of the car O, O′, O², and D a vapor regulator of familiar construction. The supply of steam to the primary radiator A is controlled by a shut-off and drain valve E. A similar valve F controls the circulation of medium through the auxiliary radiator. These valves are operated by steam motors, designated G and H respectively, supplied by a pipe I fitted to the vapor regulator on the high pressure side in alignment with pipe C, pipe I having a branch pipe J leading to the motor H. Low pressure steam passes from the vapor regulator D through pipe K to the valve E of the primary radiator. L is a return pipe leading from valve F of the auxiliary radiator B back to the vapor regulator. M is an air motor supplied with air under pressure from pipe N which is connected with the air system of the car, preferably with the air signal line P, P′, P². This motor acts in conjunction with the steam motors G and H as a selecting device to govern the action of the controlling mechanism above described, the position of its piston determining whether the heating apparatus shall be operated to deliver to the car the maximum amount of heat of which the system is capable or a reduced amount. It controls the admission of steam to the steam motor H associated with the shut off and drain valve F of the auxiliary radiator B so that the motor H can be actuated to open the auxiliary radiator only when there is pressure in the air signal line, that is, when the car is connected to a locomotive. The steam motor G, however, is subject to steam pressure and operates to open the primary radiator whenever the supply pipe C is under steam whether the steam is derived from the locomotive or from a steam supply in the yard or terminal.

Figure 7:
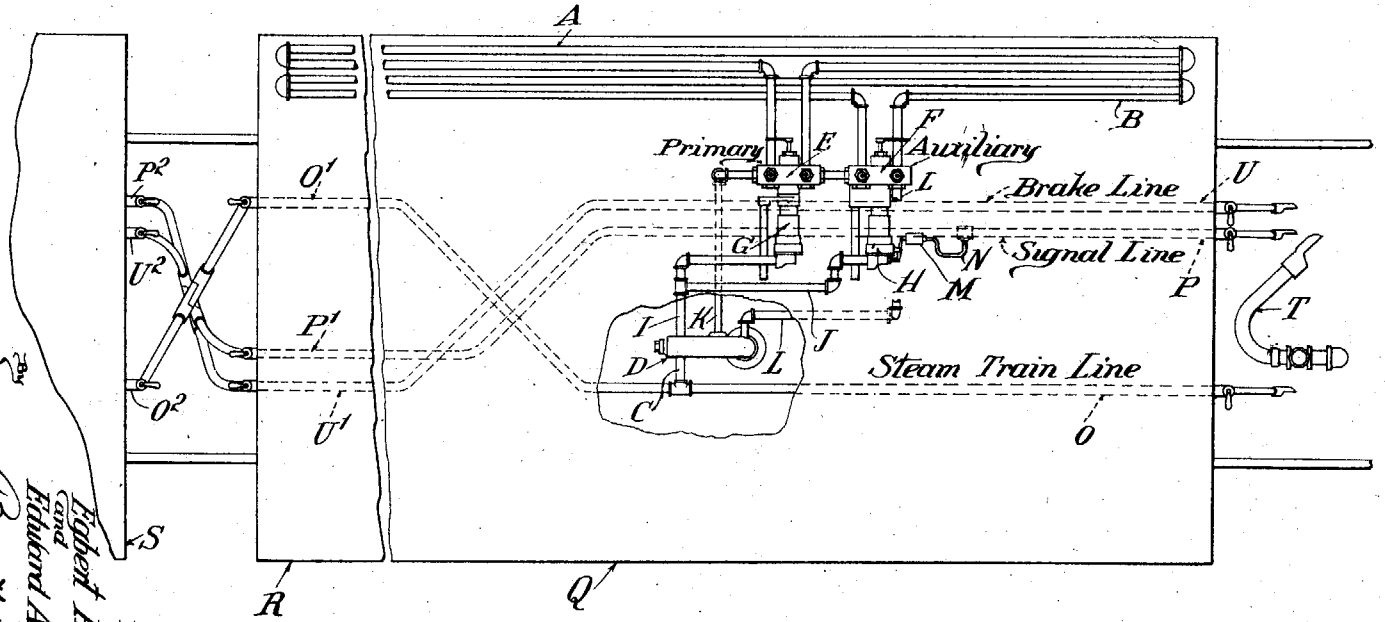
Fig. 7 is a diagram showing the apparatus as installed on one of the cars of a railway train and the connections between said car and the locomotive and the yard or terminal steam supply.

Referring to Fig. 7, Q designates the railroad car on which the heating apparatus above described is installed, this car being assumed to be the rear of the train. At R is shown fragmentarily the forward car of the train. S designates the locomotive. T is the steam supply coupling at the terminal where the train, according to this figure, is supposed to be standing. U, U′. U² is the air brake line of the train.

In Figs. 1 to 6 of the drawings the parts of the apparatus are shown in the positions which they occupy when there is pressure in the supply pipe C but no pressure in the air line N, that is to say, the parts are in the position which they occupy when the car is disconnected from the locomotive but is being heated from the yard or terminal steam line.

In Fig. 7 the car is shown as operatively connected with the locomotive, train line O being, therefore, disconnected from the terminal supply steam coupling T. In the position of the parts shown in the first six figures primary coil A is active but steam is excluded from auxiliary coil B. With the apparatus connected as shown in Fig. 7 both primary and auxiliary coils are active.

Figure 5:
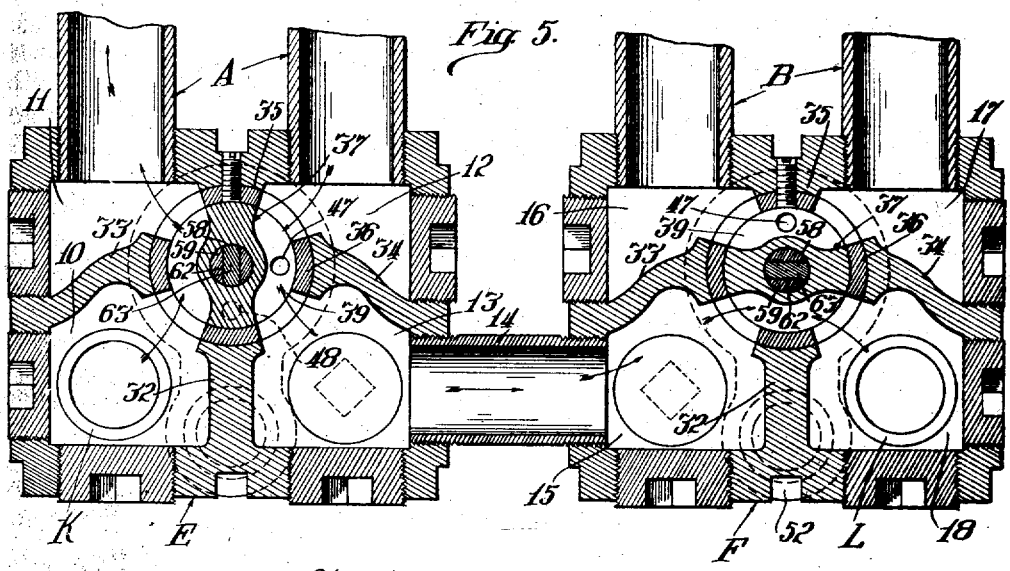
Fig. 5 is a sectional plan of the shut-off and drain valves showing their relation with each other and with the radiating coils.

The course of the steam, under these conditions, will be as follows, reference being had particularly to Figs. 1, 5 and 7: from pipe C the steam passes at high pressure through pipe I to the steam motor G of the primary radiator valve E holding the valve in its open position, as will be hereinafter described. There being no air in air line N the steam cannot reach the motor H of the auxiliary radiator valve F. Hence this valve closes its radiator. The steam from pipe C in passing into pipe K is reduced in pressure by action of the vapor regulator D and then passes into chamber 10 of valve E, thence to chamber 11 of the valve, through the primary radiator A to chamber 12 of valve E, thence to chamber 13 and through a pipe 14 to chamber 15 of valve F. The valve body of this device being in position to shut-off the auxiliary radiator B and chambers 16 and 17 with which the ends of the radiator communicate, the steam is short circuited to chamber 18 and thence into return pipe L which extends to the thermostat chamber of the vapor regulator.

Figure 6:
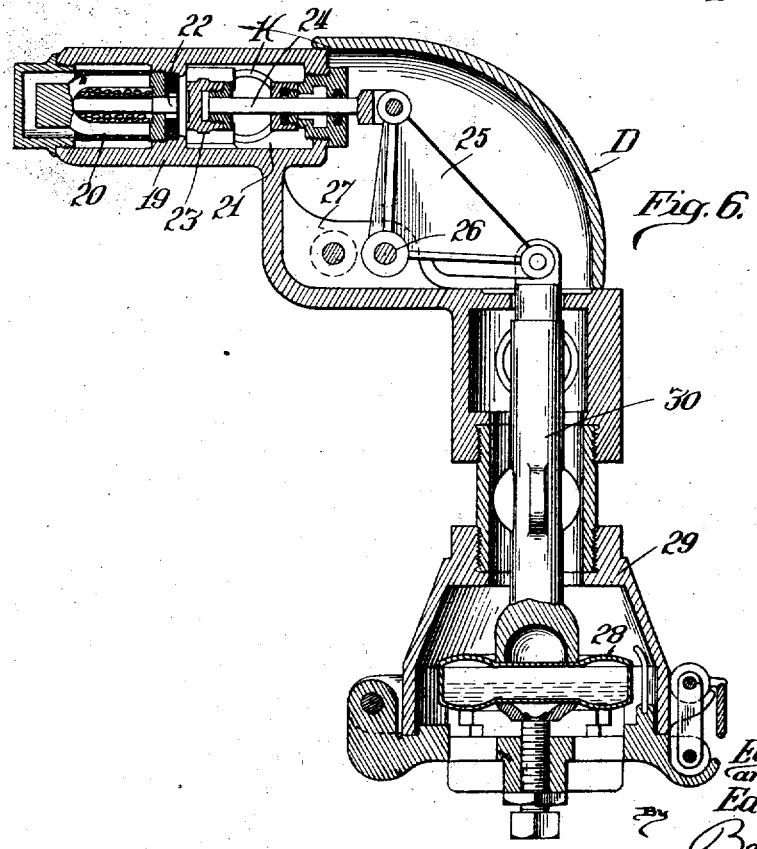
Fig. 6 is a longitudinal sectional view of a preferred form of vapor regulator, the function of which is to maintain the steam in the active radiating coil or coils at substantially atmospheric pressure.

The vapor regulator is shown in Fig. 6. It comprises a casing 19 divided to form a high pressure chamber 20 and a low pressure chamber 21, the high pressure chamber being in communication with pipes C and I and pipe K leading from the low pressure chamber 21. The port 22 between the chambers is controlled by a valve 23, the stem 24 of which is connected to a bell crank 25 pivoted at 26 to a web 27 depending from the casing 19. A thermostatic member 28 is arranged in a thermostat casing 29 to which pipe L leads, and supports a rod 30 pivoted to bell crank 25. The amount of steam passing through the vapor regulator depends upon the degree of expansion of the thermostatic member 28 which is controlled by the condition of the medium discharged from the radiating coil or coils. When the active coil or coils become filled with steam the outflow of steam through pipe L will actuate the thermostat to close valve 23, limiting the amount of steam introduced into the radiating system.

The valves E and F are alike in construction, as are also the steam motors operating said valves, respectively. It will be sufficient, therefore, to describe one of these valves and the motor associated therewith. For this purpose we have selected the auxiliary radiator valve F and its motor H, these devices being shown, so far as details are concerned, in Figs. 2, 3 and 4. The valve comprises a casing 31 divided by interior webs 32, 33, 34 and 35 (Fig. 5) into the four chambers 15, 16, 17, 18 above referred to. In the space between the webs is a cylindrical bushing 36 having openings corresponding to openings between the webs in which is arranged a valve body 37 of the butterfly type provided with upper and lower discs 38 and 39, the lower disc bearing upon the bottom web 40 of the bushing 36. The stem 41 of the valve body provided with a handle 42 is formed at its lower end with a flange 43 fastened by a screw 44 to the upper disc 38 of the valve body. The stem passes through a bonnet 45. A coil spring 46 is preferably interposed between the bonnet and flange 43 above referred to. The lower disc 39 of the valve body is provided with a drain port 47 which is adapted to register with a drain port 48 in the bottom web 40 of the bushing 36 when the valve body is in the position cutting out the radiating coil. The bottom member 49 of the valve casing is formed with a drainage duct 50 which communicates with a duct 51 formed in the upper portion 52 of the main casing of the steam motor, the upper portion of this casing being connected to the lower portion 53 by webs 54. 55 is a drainage pipe leading from duct 51 through the flooring of the car, the flooring being indicated at 56 in Fig. 1. 57 is a nut to hold the motor casing 52, 53, 54 against the bottom member 49 of the valve casing. The valve body 37 is formed with a bore 58 into which extends the upper end of a revoluble member 59 provided with a collar 60 supporting it on the bottom member 49 of the valve casing and formed with an enlargement 61 providing a thrust bearing for such revoluble member against the under side of said casing member 49. The upper end of the revoluble member 59 is formed with a slot 62 in which is arranged a flat sliding latch bolt 63, the end of which is adapted to fit into a slot 64 in the lower end of the valve stem 41. The latch bolt is kept in this position by means of a coiled spring 65 arranged in a recess 66 in the revoluble member 59. The lower end of the revoluble member is formed with a spiral slot 67 engaged by a projection or thread 68 formed on the interior of a sleeve 69 which is fastened to a stud 70 projecting from and forming part of a piston 71 arranged within an enlarged bore 72 or cylinder formed in the lower member 53 of what has been termed the motor casing. The sleeve 69 is formed with longitudinal slots 73 into which project the ends of studs 74 fixed in the casing member 53. A heavy coiled spring 75 is interposed between the top of casing member 53 and piston 71. The lower end of casing member 53 is closed by a head 53′ to which is connected the pipe J which has been described as a branch of the high pressure pipe I. The valve stem 41 is formed with a bore 76 through which projects a push rod 77 terminating at its upper end in a button 78. The lower end of the push rod is adapted to bear against the sliding latch bolt 63 which may be depressed so as to disconnect the valve from the motor to allow the valve to be operated manually by handle 42.

The above description applies to the construction of the valve and motor associated with the primary radiator A as well as to that of the valve and motor associated with the auxiliary radiator B. The auxiliary radiator, in the embodiment of our invention shown, is adapted, as stated, to be controlled ultimately in accordance with the existence of or absence of pressure in the air line P, P′, $P^2$. The arrangement for accomplishing this control will next be described.

The air motor M consists of a cylinder 79 in which is arranged a piston 80 normally held at the inlet end of the cylinder by a spring 81. The stem 82 of the piston is connected to a lever 83 pivoted at 84 to the motor casing. The lower end of lever 83 is pivotally connected to the stem 85 of a valve 86 adapted to control a port 87 of relatively small diameter between pipe J and the port 88 leading to the cylinder 72. Valve stem 85 passes through a gland 89, the bore 90 of which is of greater diameter than stem 85 and is provided with a discharge port 91 to the atmosphere. The valve 86 is a double faced valve and on its back stroke closes the duct 90.

When the air line P, P′, $P^2$ is under pressure, which occurs when the car is attached to the locomotive, piston 80 will be forced toward the outer end of cylinder 79 compressing spring 81. This withdraws valve 86 from port 87 permitting the steam pressure in pipe J to raise piston 71, compressing spring 75. The revoluble member 61 is given a quarter of a turn and the valve body 37 is moved from the position shown in Fig. 5 to a position which puts chamber 15 in communication with chamber 16, and chamber 17 in communication with chamber 18. The drain port 47, 48 is closed and the auxiliary radiator B opened to the steam supply circulating through the primary radiator A. As soon as the car is cut off from the locomotive and the pressure in the air signal line reduced to atmospheric pressure, spring 81 will force piston 80 back to its normal position moving valve 86 to close port 87 and thereby shut off steam pressure from the steam motor. The spring 75 of the motor returns the piston to its original position, rotating valve body 37 back to the position shown in Fig. 5. Steam in the cylinder 72 exhausts through ports 88, 90 and 91. In case it should be necessary to operate the valve 37 by hand, (of either the auxiliary or the primary valve devices F or E) this can be done by pressing down on push rod 77 which disconnects the valve from the motor. However, as soon as the condition of the pressure in air line P, P′, $P^2$ changes (in case of the mechanism associated with the auxiliary radiator B) or as soon as the condition of the pressure in the supply pipe C changes (in the case of the mechanism associated with radiator A), the turning of the revoluble member 59 of the motor will re-connect, automatically, the valve with the motor. To illustrate the utility of this arrangement, let us suppose that the car is taken from the yard to the terminal where, as is customary, steam train pipe O will be connected to the terminal steam supply coupling T and it is desired to heat the car rapidly before the locomotive has been attached to the train. In such case the auxiliary radiator valve will be opened by hand but as soon as the locomotive is attached to the train and pressure is established in the air pipe P the connection between the motor and the valve will be re-established so that after this the operation of the auxiliary radiator valve will take place automatically. When either radiator valve is moved to shut off its radiator a drain port is open from the radiator to the atmosphere which will allow the escape from the radiator of any water of condensation. This opening of the coils for drainage purposes takes place automatically whenever the car is cut off from the steam supply. As soon as the steam train pipe O of the car is connected to a supply of steam, on the locomotive or in the terminal or yard (by coupling T or a corresponding coupling in the yard), the valve E is immediately opened to admit steam to the primary radiator. The valve of the auxiliary radiator is subject to the same conditions except that it is opened automatically only in case, through the connection of the car to the locomotive, the air signal line P, P′, $P^2$ is under pressure. As a result of these arrangements both primary and auxiliary valves are normally open (with the car in service), the auxiliary valve being opened automatically when the car is connected with the locomotive; but because of the capacity of the valves for manual control either one or both valves may be closed, so that while the car is in service it may receive the maximum amount of heat or the smaller amount or the heat may be shut off entirely. However, when the car is cut off from the locomotive the valves, if disconnected from their motors, are at once reconnected therewith so as to restore the automatic control. For example, assume that the car is cut off from the locomotive with both valves closed. The disappearance of pressure in the steam train pipe will allow the valve stems to be rotated through action of springs 75 so as to bring latches 63 into slots 62. The disappearance of pressure in the air line will allow spring 81 to seat valve 86 in the steam port leading to the motor of the auxiliary valve F. As soon as the steam train pipe is connected to the yard steam supply valve E of the primary coil will be opened but valves F of the auxiliary coil will remain closed. Hence the car will always be given at least the reduced amount of heat although it may, by subsequent manual setting of the auxiliary valve, be given the full amount. But this does not prevent unlimited control by hand of the radiator valves while the car is in service, to give the maximum amount of heat, a smaller amount, or none at all, although normally, and without special manipulation of the valves the car is supplied, during the service period, according to the preferred form of our invention, with the maximum amount of heat that the apparatus is capable of giving and during the out of service period with the reduced amount of heat.

We claim:

1. In combination, a railway car, a mechanism made operative when the car is connected with a locomotive and inoperative when the car is disconnected from the locomotive, a radiator in the car adapted to be supplied with heating medium from the locomotive when the car is connected thereto and from another source when the car is disconnected from the locomotive, and automatically operated controlling means whereby heating medium is shut off from a portion of the radiator when the aforesaid mechanism is inoperative.

2. In combination, a railway car, a conduit to contain air under pressure, a radiator in the car, and automatically operated controlling means whereby the heating medium is circulated through all of said radiator when air pressure is present in said conduit and whereby said heating medium is circulated through only a portion of the radiator when air pressure is not present in said conduit.

3. In combination, a railway car, a signalling mechanism made operative when the car is connected with a locomotive and inoperative when the car is disconnected from the locomotive, a radiator in the car adapted to be supplied with heating medium from the locomotive when the car is connected thereto and from another source when the car is disconnected from the locomotive, and automatically operated controlling means whereby heating medium is shut off from a portion of the radiator when the aforesaid mechanism is inoperative.

4. In combination, a railway car, a signal air train pipe associated therewith normally supplied with air pressure from the locomotive, a radiator in the car, and automatically operated controlling means whereby heating medium when supplied to the radiator is circulated through all of said radiator or through only a portion of the same dependent upon whether air pressure is or is not present in said signal air train pipe.

5. In combination, a railway car, a radiator therein, controlling mechanism adapted to be set to establish a circulation of heating medium either through the radiator as a whole or through only a portion of the same, automatically actuated means for setting said controlling mechanism for one circulation or the other, and additional means for setting said mechanism for one of said circulations which additional setting means is made inoperative through actuation of the automatically actuated means.

6. In combination, a railway car, a radiator therein, controlling mechanism adapted to be set to establish a circulation of heating medium either through the radiator as a whole or through only a portion of the same, automatically actuated means for setting said controlling mechanism for the first mentioned circulation on attachment of the car to the locomotive and for the second mentioned circulation on detachment of the car therefrom, and manually operated means for setting the control mechanism for the second mentioned circulation which manually operated setting means is made inoperative on actuation of the automatically actuated setting means.

7. In combination, a railway car, a steam train pipe, a radiator in the car comprising two sections, valves to govern the flow of steam through said sections respectively, and controlling mechanism for said valves which is actuated automatically to set both valves to open position when the car is attached to a locomotive and said train pipe supplied with steam and to set one of said valves to open position and the other to closed position when the car is detached from the locomotive and the train pipe connected with another source of supply of steam.

8. In combination, a railway car, a steam train pipe, a radiator in the car comprising two sections, valves to govern the flow of steam through said sections respectively, and controlling mechanism for said valves which is actuated automatically to set both valves to open position when the car is attached to a locomotive and said train pipe supplied with steam and to set one of said valves to open position and the other to closed position when the car is detached from the locomotive and the train pipe connected with another source of supply of steam, and manually operated means for setting one of said valves to the open position when the car is detached from the locomotive which manually operated setting means releases its control of the valve automatically when the car is attached to and receives steam from the locomotive.

9. In combination, a railway car, a steam train pipe, a radiator therein comprising a plurality of sections, valves to govern the flow of heating medium through said sections respectively, controlling mechanism for said valves adapted to be set to allow the steam to circulate through the radiator as a whole or to allow the steam to circulate through a portion only of the radiator, automatically actuated means for determining which control said controlling mechanism shall be set for, and manually operated means for setting said mechanism for one control which manually operated setting means is released by operation of said automatically actuated means.

10. The combination with a railway car provided with a steam supply pipe and a pipe to contain compressed air, of two radiating coils in the car, a vapor regulator, two valves associated with said radiating coils respectively, one of said valves adapted in one position to direct steam from the supply pipe to its radiating coil and then to the other valve and in another position to direct said steam immediately to said other valve short circuiting said radiating coil and opening a drain therefrom, said other valve adapted in one position to direct steam to its radiating coil and therefrom to the vapor regulator, and in another position to direct steam immediately to the vapor regulator short circuiting its radiating coil and opening a drain therefrom, a steam motor for operating said last named valve, and means actuated by pressure in said air pipe for controlling the admission of steam to said motor.

11. The combination with a railway car provided with a steam supply pipe and a pipe to contain compressed air, of two radiating coils in the car, a vapor regulator, two valves associated with said radiating coils respectively, one of said valves adapted in one position to direct steam from the supply pipe to its radiating coil and then to the other valve and in another position to direct said steam immediately to said other valve short circuiting said radiating coil and opening a drain therefrom, said other valve adapted in one position to direct steam to its radiating coil and therefrom to the vapor regulator, and in another position to direct steam immediately to the vapor regulator short circuiting its radiating coil and opening a drain therefrom, a motor operated by steam for moving said last named valve to the first specified position and comprising a spring for moving said valve to the second specified position, and a valve opened by pressure in said air pipe for admitting steam to said motor.

12. The combination with a railway car provided with a steam supply pipe and a pipe to contain compressed air, of two radiating coils in the car, a vapor regulator, two valves associated with said radiating coils respectively, one of said valves adapted in one position to direct steam from the supply pipe to its radiating coil and then to the other valve and in another position to direct said steam immediately to said other valve short circuiting said radiating coil and opening a drain therefrom, said other valve adapted in one position to direct steam to its radiating coil and therefrom to the vapor regulator, and in another position to direct steam immediately to the vapor regulator short circuiting its radiating coil and opening a drain therefrom, steam motors associated with said valves respectively for operating the same, and a valve actuated by pressure in said air pipe for controlling the admission of steam to one of said motors.

13. The combination with a railway car provided with a steam supply pipe and a pipe to contain compressed air; of a radiator in the car comprising a primary coil and an auxiliary coil, a valve associated with the auxiliary coil which in one position puts said coil in communication with the primary coil and in another position opens a drain from the auxiliary coil and cuts off said coil from the primary coil, a motor the actuation of which is conditioned on the existence of pressure in said air pipe for moving said valve to said first specified position, said motor including a spring for moving the valve to the second specified position, and means independent of the motor for operating said valve.

14. The combination with a railway car provided with a steam supply pipe and a pipe to contain compressed air; of a radiator in the car comprising a primary coil and an auxiliary coil, a valve associated with the auxiliary coil which in one position puts said coil in communication with the primary coil and in another position opens a drain from the auxiliary coil and cuts off said coil from the primary coil, a motor the actuation of which is conditioned on the existence of pressure in said air pipe for moving said valve to said first specified position, said motor including a spring for moving the valve to the second specified position, said valve having a handle for moving it, and means for disconnecting the valve from the motor.

15. The combination with a railway car provided with a steam supply pipe and a pipe to contain compressed air; of a radiator in the car comprising a primary coil and an auxiliary coil, a valve associated with the auxiliary coil which in one position puts said coil in communication with the primary coil and in another position opens a drain from the auxiliary coil and cuts off said coil from the primary coil, a motor the actuation of which is conditioned on the existence of pressure in said air pipe for moving said valve to said first specified position, said motor including a spring for moving the valve to the second specified position, said valve having a handle for moving it, and means for disconnecting the valve from the motor and for re-connecting it thereto automatically when the pressure condition in the air pipe changes.

16. The combination with a railway car provided with a steam supply pipe and a pipe to contain compressed air, of two radiating coils in the car, a vapor regulator, two valves associated with said radiating coils respectively, one of said valves adapted in one position to direct steam from the supply pipe to its radiating coil and then to the other valve and in another position to direct said steam immediately to said other valve short circuiting said radiating coil and opening a drain therefrom, said other valve adapted in one position to direct steam to its radiating coil and therefrom to the vapor regulator, and in another position to direct steam immediately to the vapor regulator short circuiting its radiating coil and opening a drain therefrom, steam motors associated with said valves respectively for operating the same, a valve actuated by pressure in said air pipe for controlling the admission of steam to one of said motors, each of said valves being provided with a handle, and means for releasing the connection between each valve and its motor.

17. In a heating system, the combination of a supply pipe to contain heating medium under pressure, a radiator, a shut-off and drain valve interposed between the supply pipe and radiator, and means actuated alternately by the presence of and absence of pressure in the supply pipe for respectively opening communication between the supply pipe and radiator and for cutting off the radiator from the supply pipe and opening a drain therefrom.

18. In a heating system, the combination of a supply pipe to contain heating medium under pressure, a radiator, a shut-off and drain valve interposed between the supply pipe and radiator, a motor actuated by steam from said supply pipe for operating said valve, and means whereby the valve may be disconnected from the motor and opened and closed independently thereof.

19. In a heating system, the combination of a supply pipe to contain heating medium under pressure, a radiator, a shut-off and drain valve interposed between the supply pipe and radiator, a motor actuated by steam from said supply pipe for operating said valve, means providing a releasable connection between said valve and motor, a handle on the valve, and means for releasing said connection between the valve and motor.

20. In a heating system, the combination of a supply pipe to contain heating medium under pressure, a radiator, a shut-off and drain valve interposed between the supply pipe and radiator, a motor actuated by steam from said supply pipe for operating said valve, means independent of the motor for operating the valve, and means providing a releasable connection between said valve and motor which is automatically re-established when the pressure in the supply pipe changes.

21. In a heating system, the combination of a supply pipe to contain heating medium under pressure, a radiator, a shut-off and drain valve interposed between the supply pipe and radiator, a motor actuated by steam from said supply pipe for operating said valve, a handle for operating said valve, and means associated with the handle for disconnecting the valve from said motor.

22. In a heating system, the combination of a supply pipe to contain heating medium under pressure, a radiator, a shut-off and drain valve interposed between the supply pipe and radiator, a motor actuated by steam from said supply pipe for operating said valve, a handle for operating said valve, and means providing a releasable connection between said valve and motor which is automatically reestablished when a change of pressure in the supply pipe takes place.

23. In combination, a railway car, a radiator therein, a supply pipe for a heating medium under pressure and controlling mechanism adapted to be set for either one of two controls, one of which allows a circulation of heating medium through the entire radiator and the other through only a portion of the same, the setting of said mechanism for the first control being automatically effected by attachment of the car to the locomotive and for the second control by detachment of the car from the locomotive and both of said controls being dependent on pressure in said supply pipe.

24. In combination, a railway car, a conduit to contain air under pressure, a radiator in the car, a supply pipe for the heating medium under pressure and controlling mechanism adapted to be set for either one of two controls, one of which allows circulation through the entire radiator and the other through only a portion of the same, the setting of said mechanism for the first control being automatically effected through the introduction of air under pressure into said conduit and for the second control by the disappearance of pressure therefrom both of said controls being dependent upon pressure in said supply pipe.

25. The combination with the signal air train pipe of a railway car, a heating apparatus comprising a radiator and a controlling mechanism adapted to be set for either one of two controls, one of which allows circulation of heating medium through the entire radiator and the other through only a portion of the same, the setting of said mechanism for the first control being automatically effected by pressure in said signal air train pipe and for the second control by disappearance of pressure in said air train pipe both of said controls being dependent upon pressure in said steam train pipe.

26. In combination, a railway car, a radiator, a supply pipe for heating medium under pressure, controlling mechanism adapted to be set, upon the existence of pressure in said supply pipe, for either one of two controls, one of which allows circulation of the heating medium through the entire radiator and the other through only a portion of the same, means actuated automatically under predetermined conditions for setting said controlling mechanism, and manually operated setting means for the controlling mechanism which manually operated setting means is made inoperative when said automatically actuated means is actuated.

27. In combination, a railway car, a radiator therein, a supply pipe for heating medium under pressure, a conduit to contain air under pressure, a valve to govern the circulation of heating medium through the radiator, and means for opening said valve, the operation of which is dependent upon pressure in both said supply pipe and said air conduit.

28. In combination, a railway car, a radiator therein, controlling mechanism adapted to be set to establish a circulation of heating medium either through the radiator as a whole or through only a portion of same, and automatically actuated means for setting said controlling mechanism for the first mentioned control on attachment of the car to the locomotive, and for the second mentioned control on detachment of the car therefrom.

29. The combination with a railway car provided with a steam supply pipe and a pipe to contain compressed air, of two radiating coils in the car, a vapor regulator, two valves associated with said radiating coils, respectively, one of said valves adapted in one position to direct steam from the supply pipe to its radiating coil and then to the other valve and in another position to direct such steam immediately to said other valve, short circuiting said radiating coil and opening a drain therefrom, said other valve adapted in one position to direct steam to its radiating coil and therefrom to the vapor regulator, and in another position to direct steam immediately to the vapor regulator, short circuiting its radiating coil and opening a drain therefrom, steam motors associated with said valves, respectively, and communicating directly with the steam supply pipe so as to be subject to the high pressure therein, for operating said valves, and a valve actuated by pressure in said air pipe for controlling the admission of steam to one of said motors.

30. In a steam heating system for a railway car provided with a steam train pipe, heating means connected with the train pipe to receive steam therefrom, and mechanism actuated on cessation of steam supply to the train pipe for opening a drainage outlet for water of condensation from the heating means.

31. In a steam heating system for a railway car provided with a steam train pipe, heating means connected with the train pipe to receive steam therefrom, and provided with a drainage outlet for water of condensation, and mechanism actuated when the train pipe is supplied with steam to close said outlet and when steam is cut off from the train pipe to open said outlet.

32. In a steam heating system for a railway car provided with a steam train pipe, heating means connected with the train pipe to receive steam therefrom, a valve to close communication between the train pipe and heating means provided with a drainage outlet in communication with the heating means which is open when the valve is closed, and mechanism actuated when steam is shut off from the train pipe for moving said valve to its closed and draining position.

33. In a steam heating system for a railway car provided with a steam train pipe, heating means connected with the train pipe to receive steam therefrom, and mechanism actuated by pressure changes in said steam train pipe for opening a drainage outlet for water of condensation from said heating means on cessation of steam supply to said train pipe.

34. In a steam heating system for a railway car provided with a steam train pipe, heating means connected with the train pipe to receive steam therefrom and provided with a drainage outlet for water of condensation, and mechanism subject to pressure changes in said train pipe actuated, when the train pipe is supplied with steam, to close said outlet and when steam is cut off from the train pipe to open said outlet.

35. In a steam heating system for a railway car provided with a steam train pipe, heating means connected with the train pipe to receive steam therefrom, a valve to close communication between the train pipe and heating means provided with a drainage outlet in communication with the heating means which is open when the valve is closed, and mechanism subject to pressure changes in the train pipe actuated when steam is shut off from the train pipe for moving said valve to its closed and draining position.

36. In combination, a railway car, a mechanism made operative when the car is connected with a locomotive and inoperative when the car is disconnected from the locomotive, a radiator in the car adapted to be supplied with steam from the locomotive when the car is connected thereto and from a different source when the car is disconnected from the locomotive, automatically operated controlling means; in addition to the aforesaid mechanism whereby steam is excluded from a portion of the radiator when the aforesaid mechanism is inoperative, and means for maintaining the steam in said radiator, or a portion of the same as the case may be, at a substantially uniform pressure.

37. In combination with a railway car, a steam train pipe adapted to be supplied with steam from a locomotive and also from another source of supply of steam when the car is disconnected from the locomotive, an air train pipe adapted to be connected with a source of supply of air under pressure on the locomotive, a radiator in the car, means whereby steam is excluded from a portion of the radiator when the car is cut off from the locomotive and the train pipe connected with said other source of supply of steam, and means for maintaining the steam in said radiator, or portion of the same as the case may be, at a substantially uniform pressure.

38. In combination, a railway car, a radiator therein adapted to receive steam, controlling mechanism adapted to be set to establish a circulation of steam through the radiator as a whole or through only a portion of the same, automatically actuated means for setting said controlling mechanism for the first mentioned control on attachment of the car to the locomotive and for the second mentioned control on detachment of the car therefrom, and means for maintaining the steam in said radiator, or portion of the same as the case may be, at a relatively uniform pressure.

39. In combination with the heating apparatus of a railway car adapted to heat the car when the latter is connected with a locomotive and also, from a stationary source of heat energy, when the car stands disconnected from the locomotive in a yard or terminal, manually operable control mechanism adapted to be set to put said heating apparatus out of operation, and means actuated on disconnection of the car from the locomotive to automatically reset said control mechanism to a position in which said heating apparatus, when connected with said stationary source of heat energy, is made operative to heat the car.

40. In combination with the heating apparatus of a railway car adapted to heat the car when the latter is connected with a locomotive and also, from a stationary source of heat energy, when the car stands disconnected from the locomotive in a yard or terminal, manually operable control mechanism adapted to be set to put said heating apparatus out of operation, and means actuated on disconnection of the car from the locomotive to automatically reset said control mechanism to a position in which said heating apparatus, when connected with said stationary source of heat energy, is made operative to deliver heat to the car in quantities less than the maximum capacity of the apparatus.

41. In combination with the heating apparatus of a railway car adapted to heat the car when the latter is connected with a locomotive and also, from a stationary source of heat energy, when the car stands disconnected from the locomotive in a yard or terminal, manually operable control mechanism adapted to be set to put said heating apparatus out of operation, and means actuated on connection of the car to, and also on disconnection of the car from, the locomotive to automatically reset said control mechanism to a position in which said heating apparatus, when connected with said stationary source of heat energy, is made operative to heat the car.

42. In combination with the heating apparatus of a railway car adapted to heat the car when the latter is connected with a locomotive and also, from a stationary source of heat energy, when the car stands disconnected from the locomotive in a yard or terminal, manually operable control mechanism adapted to be set to put said apparatus out of operation, or to vary the amount of heat delivered to the car, and means actuated on disconnection of the car from the locomotive for resetting said mechanism to a position in which said heating apparatus, when connected with said stationary source of heat energy, delivers heat to the car in quantities less than the maximum capacity of said apparatus.

43. In combination with the heating apparatus of a railway car adapted to heat the car when the latter is connected with a locomotive and also, from a stationary source of heat energy, when the car stands disconnected from the locomotive in a yard or terminal, manually operable control mechanism adapted to be set to put said apparatus out of operation, or to vary the amount of heat delivered to the car, and means actuated on connection of the car to the locomotive for resetting said control mechanism to cause the heating apparatus to deliver heat to the car at the full capacity of said apparatus.

44. In combination with the heating apparatus of a railway car adapted to heat the car when the latter is connected with a locomotive and also, from a stationary source of heat energy, when the car stands disconnected from the locomotive in a yard or terminal, manually operable control mechanism adapted to be set to vary the amount of heat delivered to the car, and means actuated on disconnection of the car from the locomotive for re-setting said mechanism to a position in which said heating apparatus, when connected with said stationary source of heat energy, delivers heat to the car in quantities less than the maximum capacity of the apparatus.

45. In combination with the heating apparatus of a railway car adapted to heat the car when the latter is connected with a locomotive and also, from a stationary source of heat energy, when the car stands disconnected from the locomotive in a yard or terminal, manually operable control mechanism adapted to be set to vary the amount of heat delivered to the car, and means actuated on connection of the car to the locomotive for re-setting said mechanism to cause the heating apparatus to deliver heat to the car at the full capacity of said apparatus.

46. In combination with the heating apparatus of a railway car adapted to heat the car when the latter is connected with a locomotive and also, from a stationary source of heat energy, when the car stands disconnected from the locomotive in a yard or terminal, manually operable mechanism adapted to be set during periods of either attachment of the car to or detachment of the car from the locomotive to vary the quantity of heat delivered to the car, and automatically operating mechanism, in addition to said manually operating mechanism actuated when the car is attached to the locomotive for causing said apparatus to deliver relatively large quantities of heat to the car and, when the car is disconnected from the locomotive and the heating apparatus connected with said stationary source of heat energy, to cause said apparatus to deliver smaller quantities of heat to the car.

47. In combination with a railway car having steam and compressed air train pipes, a radiator adapted to receive steam from a locomotive and from another source of supply of steam, manually operable mechanism for the radiator, and automatic means for operating said valve mechanism effective to admit steam to the radiator in relatively large amounts when the car is connected with a locomotive and in smaller amounts when the car is disconnected from the locomotive and the radiator put into communication with said other source of supply of steam regardless of the previous manual setting of said valve mechanism.

48. In combination with a railway car having steam and compressed air train pipes, a radiator, radiator valve mechanism, means actuated at superatmospheric pressure in said air train pipe for operating said mechanism to effect circulation of steam through the radiator in relatively large amounts and on reduction of pressure in the air train pipe to atmospheric pressure to effect circulation of steam through said radiator in smaller amounts, and means for setting said valve mechanism manually without affecting the subsequent operations, as above set forth, of said pressure actuated means.

49. In combination with heating apparatus, means for controlling said apparatus comprising manually operated controlling mechanism adapted to be set to put said apparatus into or out of operation, and automatic selecting mechanism cooperating with said manually operable controlling mechanism which when moved to one position puts said heating apparatus in operation regardless of the previous position of said controlling mechanism.

50. In combination with heating apparatus, means for controlling said apparatus comprising manually operated controlling mechanism adapted to be set to put said apparatus into or out of operation, and automatic selecting mechanism cooperating with said manually operable controlling mechanism which when moved to one position puts said heating apparatus in operation but for the delivery of an amount of heat less than the maximum which said apparatus is capable of delivering, regardless of the previous position of said controlling mechanism.

51. In combination with heating apparatus, means for controlling said apparatus comprising automatic selecting mechanism which in one position sets said heating apparatus in operation for delivery of the full amount of heat which the apparatus is capable of delivering, and in another position brings about operation of the heating apparatus for delivery of a reduced amount of heat, and manually operable means cooperating with said selecting mechanism, adapted to be set to put said heating apparatus out of operation between movements of said selecting mechanism which is ineffective to prevent the subsequent control of said apparatus by said selecting mechanism as hereinabove set forth.

52. In a car heating system adapted to be supplied with steam from a locomotive, when the car is attached to said locomotive, and from a stationary source of supply, when the car is cut off from the locomotive, the combination of a radiator valve mechanism operable manually to control the flow of steam to said radiator, and means actuated when the car is cut off from the locomotive and its heating system supplied with steam from said stationary source for operating said valve mechanism, regardless of the position to which it may have been set manually, to permit flow of steam to the radiator.

53. In a car heating system adapted to be supplied with steam from a locomotive, when the car is attached to the locomotive, and from a stationary source of supply when the car is cut off from the locomotive, the combination of a radiator, valve mechanism operable manually to limit the flow of steam to said radiator, and means actuated when the car is again connected with the locomotive after a period of disconnection for operating said valve mechanism, regardless of the position to which it may have been set manually, to permit the radiator to be supplied with steam to the maximum radiating capacity thereof.

EGBERT H. GOLD.
EDWARD A. RUSSELL.